US008835087B2

(12) United States Patent
Fukuri et al.

(10) Patent No.: US 8,835,087 B2
(45) Date of Patent: Sep. 16, 2014

(54) POLYESTER FOR TONER

(75) Inventors: Norihiro Fukuri, Wakayama (JP); Takashi Kubo, Wakayama (JP); Katsutoshi Aoki, Wakayama (JP); Yasunori Inagaki, Wakayama (JP)

(73) Assignee: Kao Corporation, Tokyo (JP)

( * ) Notice: Subject to any disclaimer, the term of this patent is extended or adjusted under 35 U.S.C. 154(b) by 49 days.

(21) Appl. No.: 13/498,471

(22) PCT Filed: Sep. 30, 2010

(86) PCT No.: PCT/JP2010/067148
§ 371 (c)(1), (2), (4) Date: Mar. 27, 2012

(87) PCT Pub. No.: WO2011/040569
PCT Pub. Date: Apr. 7, 2011

(65) Prior Publication Data

US 2012/0184708 A1 Jul. 19, 2012

(30) Foreign Application Priority Data

Oct. 1, 2009 (JP) ................................ 2009-229855

(51) Int. Cl.
*G03G 9/083* (2006.01)
*G03G 9/087* (2006.01)

(52) U.S. Cl.
CPC ............ *G08G 63/60* (2013.01); *G03G 9/08795* (2013.01); *G03G 9/08797* (2013.01); *G03G 9/08755* (2013.01)
USPC ........ 430/109.4; 528/296; 528/301; 528/303; 528/304; 528/306

(58) Field of Classification Search
CPC .......... G03G 9/08755; G03G 9/08791; G03G 9/08795
USPC .......................... 528/296, 301, 303, 304, 306
See application file for complete search history.

(56) References Cited

U.S. PATENT DOCUMENTS

| | | | | |
|---|---|---|---|---|
| 3,867,480 | A * | 2/1975 | Fujiyoshi et al. | 525/172 |
| 4,481,353 | A * | 11/1984 | Nyilas et al. | 528/303 |
| 2008/0131802 | A1 * | 6/2008 | Mizutani et al. | 430/109.4 |
| 2010/0040967 | A1 | 2/2010 | Hamasaki et al. | |
| 2012/0021350 | A1 | 1/2012 | Fukuri et al. | |

FOREIGN PATENT DOCUMENTS

| | | | |
|---|---|---|---|
| JP | 48-6618 | B1 | 2/1973 |
| JP | 1-275615 | | 11/1989 |
| JP | 9-274335 | A | 10/1997 |
| JP | 2007-269842 | A | 10/2007 |
| JP | 2008-120920 | A | 5/2008 |
| JP | 2009-3116 | A | 1/2009 |
| JP | 2009-197069 | A | 9/2009 |

OTHER PUBLICATIONS

U.S. Appl. No. 13/498,501, filed Mar. 27, 2012, Fukuri, et al.
U.S. Appl. No. 13/499,309, filed Mar. 30, 2012, Kubo, et al.
International Search Report issued Oct. 26, 2010 in PCT/JP2010/067148.
Combined Chinese Office Action and Search Report issued on Feb. 5, 2013, in Chinese Patent Application No. 201080041625.2 with English translation.
Office Action in corresponding Japanese Application No. 2010 mailed Jun. 3, 2014.
L. Lei et al, "Synthesis, characterization and in vitro degradation of a novel degradable poly(1,2-propanediol-sebacate)-citrate) bioelastomer", *Polymer Degradation and Stability*, 92, (2007), 389-396.

* cited by examiner

*Primary Examiner* — Gregory Listvoyb
(74) *Attorney, Agent, or Firm* — Oblon, Spivak, McClelland, Maier & Neustadt, L.L.P.

(57) ABSTRACT

A polyester for a toner obtained by polycondensing an aliphatic hydroxycarboxylic acid compound having a total number of hydroxy group or groups and carboxyl group or groups of 4 or more; an alcohol component containing an aliphatic diol having a hydroxyl group bound to a secondary carbon atom in an amount of 50% by mol or more; and a carboxylic acid component, provided that the aliphatic hydroxycarboxylic compound is not included, wherein the aliphatic hydroxycarboxylic acid compound and the aliphatic diol having a hydroxyl group bound to a secondary carbon atom are in a molar ratio, i.e. the aliphatic hydroxycarboxylic acid compound/the aliphatic diol having a hydroxyl group bound to a secondary carbon atom, of from 0.05 to 0.8; a resin binder for a toner, containing the polyester; and a toner for electrophotography, containing the resin binder. The polyester for a toner of the present invention is suitably used for a resin binder of a toner usable in development or the like of latent images formed in, for example, electrophotography, electrostatic recording method, electrostatic printing method or the like.

10 Claims, No Drawings

POLYESTER FOR TONER

TECHNICAL FIELD

The present invention relates to a polyester for a toner usable in development or the like of latent images formed in, for example, electrophotography, an electrostatic recording method, an electrostatic printing method, or the like, a resin binder for a toner containing the polyester, and a toner for electrophotography containing the resin binder.

BACKGROUND ART

In recent years, with the advancements in speed-up and energy conservation of the machines, toners having excellent low-temperature fixing ability and hot offset resistance are in demand.

Patent Publication 1 discloses, as an objective of providing a toner which is excellent in all of low-temperature fixing ability, offset resistance, pulverizability, dispersibility of an internal additive, and storage property, a toner containing, as resin binders, a polyester resin (A) and a polyester resin (B) having a softening point calculated from the softening point of the polyester resin (A) plus 10° C. or more, wherein the above polyester resin (A) is a resin having a polyester unit obtained by polycondensing an alcohol component containing 1,2-propanediol in an amount of 65% by mol of the dihydric alcohol component, and a carboxylic acid component containing a (meth)acrylic acid-modified rosin, and wherein the above polyester resin (B) is a resin having a polyester unit obtained by polycondensing an alcohol component containing 1,2-propanediol and 1,3-propanediol in a total amount of 70% by mol or more of the dihydric alcohol component and a carboxylic acid component containing a purified resin.

Patent Publication 2 discloses, as an objective of providing a toner having degradability which has excellent fixing ability, fixing strength, offset resistance, and blocking resistance, a toner for electrostatic image development, characterized in that the toner contains a polyester resin obtained by subjecting a composition containing lactic acid and a hydroxycarboxylic acid having three or more functional groups to a dehydration polycondensation, and a colorant.

PRIOR ART REFERENCES

Patent Publications

Patent Publication 1: Japanese Patent Laid-Open No. 2009-003116

Patent Publication 2: Japanese Patent Laid-Open No. Hei-9-274335

SUMMARY OF THE INVENTION

Problems to be Solved by the Invention

However, in the patent publications mentioned above, all of low-temperature fixing ability, hot offset resistance and durability cannot be satisfied.

The present invention relates to a toner for electrophotography having excellent durability in addition to low-temperature fixing ability and hot offset resistance, a polyester for a toner, usable in the toner, and a resin binder for a toner.

Means to Solve the Problems

The present invention relates to:

[1] a polyester for a toner obtained by polycondensing an aliphatic hydroxycarboxylic acid compound having a total number of hydroxy group or groups and carboxyl group or groups of 4 or more;

an alcohol component containing an aliphatic diol having a hydroxyl group bound to a secondary carbon atom in an amount of 50% by mol or more; and a carboxylic acid component, provided that the aliphatic hydroxycarboxylic compound is not included, wherein the aliphatic hydroxycarboxylic acid compound and the aliphatic diol having a hydroxyl group bound to a secondary carbon atom are in a molar ratio, i.e. the aliphatic hydroxycarboxylic acid compound/the aliphatic diol having a hydroxyl group bound to a secondary carbon atom, of from 0.05 to 0.8;

[2] a resin binder for a toner, containing the polyester for a toner as defined in the above [1]; and

[3] a toner for electrophotography, containing the resin binder as defined in the above [2].

Effects of the Invention

The toner for electrophotography of the present invention which contains a polyester for a toner as a resin binder exhibits some excellent effects in low-temperature fixing ability, hot offset resistance, and durability.

MODES FOR CARRYING OUT THE INVENTION

In the polyester for a toner of the present invention, an aliphatic hydroxycarboxylic acid compound having a total number of hydroxy group or groups and carboxyl group or groups of 4 or more (hereinafter simply referred to as an aliphatic hydroxycarboxylic acid compound); an alcohol component containing an aliphatic diol having a hydroxyl group bound to a secondary carbon atom in an amount of 50% by mol or more; and a carboxylic acid component are used as raw material monomers. By the synergistic effects of the aliphatic hydroxycarboxylic acid compound and the aliphatic diol having a hydroxyl group bound to a secondary carbon atom, the polyester has excellent low-temperature fixing ability, hot offset resistance, and durability. This is presumably due to the fact that since the above-mentioned aliphatic hydroxycarboxylic acid compound has a high reactivity percentage to the alcohol component containing the aliphatic diol having a hydroxyl group bound to a secondary carbon atom, it is possible to form the polyester with an increased molecular weight, thereby improving durability in addition to low-temperature fixing ability and hot offset resistance. On the other hand, in a case where a hydroxycarboxylic acid other than the above-mentioned aliphatic hydroxycarboxylic acid compound, such as lactic acid or salicylic acid, or a compound such as glycerol or a trimellitic acid compound is used, the offset resistance and the durability of the toner is lowered, as compared to a case where the above-mentioned aliphatic hydroxycarboxylic acid compound is used, and this is presumably due to the fact that the reactivity percentage is low so that a low molecular weight component increases.

The aliphatic hydroxycarboxylic acid compound in the present invention has a total number of hydroxy group or groups and carboxyl group or groups of 4 or more, preferably from 4 to 6, and more preferably from 4 to 5, from the viewpoint of having excellent low-temperature fixing ability, hot offset resistance, and durability. The aliphatic hydroxycarboxylic acid compound has the number of carboxyl group or groups in one molecule of preferably 2 or more, more preferably from 2 to 4, and even more preferably from 2 to 3, from the viewpoint of durability. The aliphatic hydroxycarboxylic acid compound has the number of hydroxy group or groups in one molecule of preferably from 1 to 3, and more preferably from 1 to 2, from the viewpoint of durability. The aliphatic hydroxycarboxylic acid compound has a ratio of the number of hydroxy group or groups to the number of hydroxy group or groups in one molecule, i.e. the number of carboxyl group or groups/the number of hydroxy group or groups, of preferably 1 or more, preferably from 1 to 4, and more preferably from 1 to 3, from the viewpoint of durability. Here, the hydroxycarboxylic acid compound contains one or more of each of hydroxy group or groups and carboxyl group or groups.

The aliphatic hydroxycarboxylic acid compound has preferably 4 or more carbon atoms, more preferably 4 to 10 carbon atoms, and even more preferably 4 to 8 carbon atoms, from the viewpoint of low-temperature fixing ability, hot offset resistance, and durability.

Specific examples include tartaric acid (4 carbon atoms: carboxyl groups 2, hydroxy groups 2), citric acid (6 carbon atoms: carboxyl groups 3, hydroxy group 1), isocitric acid (6 carbon atoms: carboxyl groups 3, hydroxy group 1), gluconic acid (6 carbon atoms: carboxyl group 1, hydroxy groups 5), and the like, and it is preferable that the aliphatic hydroxycarboxylic acid is at least one of tartaric acid and citric acid, from the viewpoint of low-temperature fixing ability, hot offset resistance, and durability. The carboxyl group may be in the form of an ester of an acid anhydride or a lower alcohol (1 to 3 carbon atoms). In the present invention, carboxylic acids and derivatives such as acid anhydrides and alkyl(1 to 3 carbon atoms) esters are collectively referred to as the carboxylic acid compound.

The aliphatic hydroxycarboxylic acid compound is contained in an amount of preferably from 0.5 to 80% by mol, more preferably from 1 to 50% by mol, and even more preferably from 2 to 30% by mol, of a total amount of the aliphatic hydroxycarboxylic acid compound, the alcohol component, and the carboxylic acid component, from the viewpoint of having excellent low-temperature fixing ability, hot offset resistance and durability.

The alcohol component contains an aliphatic diol having a hydroxyl group bound to a secondary carbon atom in an amount of 50% by mol or more, from the viewpoint of having excellent hot offset resistance of the toner. Here, the alcohol component does not include a compound having a carboxyl group. Therefore, the above-mentioned aliphatic hydroxycarboxylic acid compound is also not included in the alcohol component.

The aliphatic diol having a hydroxyl group bound to a secondary carbon atom has preferably 3 to 8 carbon atoms, and more preferably 3 to 6 carbon atoms, from the viewpoint of low-temperature fixing ability and hot offset resistance of the toner. Specific preferred examples thereof include 1,2-propanediol, 1,2-butanediol, 1,3-butanediol, 2,3-butanediol, 1,2-pentanediol, 1,3-pentanediol, 1,4-pentanediol, 2,3-pentanediol, 2,4-pentanediol, 1,2-hexanediol, 1,3-hexanediol, 1,4-hexanediol, 1,5-hexanediol, 2,3-hexanediol, 3,4-hexanediol, 2,4-hexanediol, 2,5-hexanediol, and the like.

The aliphatic diol having a hydroxyl group bound to a secondary carbon atom is contained in an amount of 50% by mol or more, preferably 60% by mol or more, more preferably 70% by mol or more, even more preferably 75% by mol or more, even more preferably 80% by mol or more, even more preferably 90% by mol or more, and even more preferably 95% by mol or more, of the alcohol component, from the viewpoint of low-temperature fixing ability and hot offset resistance of the toner. Therefore, the aliphatic diol having a hydroxyl group bound to a secondary carbon atom is contained in an amount of preferably from 50 to 100% by mol, more preferably from 60 to 100% by mol, even more preferably from 70 to 100% by mol, even more preferably from 75 to 100% by mol, even more preferably from 80 to 100% by mol, even more preferably from 90 to 100% by mol, and even more preferably from 95 to 100% by mol, of the alcohol component.

The aliphatic hydroxycarboxylic acid compound and the aliphatic diol having a hydroxyl group bound to a secondary carbon atom mentioned above are in a molar ratio, i.e. the aliphatic hydroxycarboxylic acid compound/the aliphatic diol having a hydroxyl group bound to a secondary carbon atom, of from 0.05 to 0.8, preferably from 0.05 to 0.6, and more preferably from 0.1 to 0.5, from the viewpoint of low-temperature fixing ability, hot offset resistance and durability of the toner.

As other alcohols, preferred are an alkylene oxide adduct of bisphenol A represented by the formula (I):

(I)

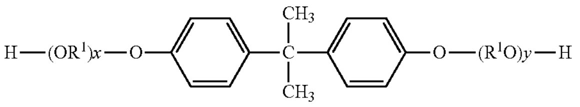

wherein $R^1O$ and $OR^1$ are an oxyalkylene group, wherein $R^1$ is an ethylene group and/or a propylene group; and each of x and y is a positive number showing an average number of moles of alkylene oxide added, wherein an average number of the sum of x and y is preferably from 1 to 16, more preferably from 1 to 8, and even more preferably from 1.5 to 4, or an aliphatic diol other than the aliphatic diol having a hydroxyl group bound to a secondary carbon atom. The alkylene oxide adduct of bisphenol A is preferred, from the viewpoint of storage property of the toner. Specific examples of the alkylene oxide adduct of bisphenol A represented by the formula (I) include an alkylene oxide adduct of bisphenol A such as a polyoxypropylene adduct of 2,2-bis(4-hydroxyphenyl)propane and a polyoxyethylene adduct of 2,2-bis(4-hydroxyphenyl)propane; and the like.

The aliphatic diol other than the aliphatic diol having a hydroxyl group bound to a secondary carbon atom includes ethylene glycol, 1,3-propanediol, 1,4-butanediol, 1,5-pentanediol, 1,6-hexanediol, 1,4-butenediol, neopentyl glycol, and the like.

As other trihydric or higher polyhydric alcohols, the trihydric or higher polyhydric alcohols, such as glycerol, pentaerythritol, and trimethylolpropane may be used within the range so as not to impair the effects of the present invention.

The carboxylic acid component includes an aromatic dicarboxylic acid compound, an aromatic hydroxycarboxylic acid compound, an aliphatic dicarboxylic acid compound, and the like, among which the aromatic carboxylic acid compound and/or the aromatic hydroxycarboxylic acid compound are preferred, from the viewpoint of storage property and durability of the toner. Here, the above-mentioned aliphatic hydroxycarboxylic acid compound is not included in the carboxylic acid component.

The aromatic carboxylic acid compound and the aromatic hydroxycarboxylic acid compound are contained in a total amount of preferably from 20 to 100% by mol, more preferably from 30 to 100% by mol, even more preferably from 40 to 90% by mol, and still even more preferably from 50 to 90% by mol, of the carboxylic acid component, from the viewpoint of storage property and durability of the toner.

The aromatic dicarboxylic acid compound is preferably phthalic acid, isophthalic acid, terephthalic acid, or the like, from the viewpoint of low-temperature fixing ability, storage property and durability of the toner. The aromatic carboxylic acid compound is contained in an amount of preferably from 20 to 100% by mol, more preferably from 30 to 100% by mol, even more preferably from 40 to 90% by mol, and still even more preferably from 50 to 90% by mol, of the carboxylic acid component, from the viewpoint of low-temperature fixing ability, storage property and durability of the toner.

In the aromatic hydroxycarboxylic acid compound, a total number of hydroxy group or groups and carboxyl group or groups is preferably from 2 to 4, and more preferably from 2 to 3. Among them, an aromatic hydroxycarboxylic acid compound having an alkoxy group (1 to 3 carbon atoms) is preferred, and those in which a methoxy group and a hydroxy group are bound to carbon atoms which are adjacent to each other are more preferred, from the viewpoint of initial rise in triboelectric charging and storage property of the toner. Specific examples are preferably at least one aromatic hydroxycarboxylic acid compound selected from the group consisting of ferulic acid, 5-hydroxyferulic acid, vanillic acid, sinapic acid and syringic acid. Since in these compounds a methoxy group and a hydroxyl group having electron donating ability are bound to carbon atoms which are adjacent to each other in the aromatic ring, it is considered that the compounds form a monomer having a phenolic hydroxyl group of a high pKa (isoelectric point), so that the electron density increases in the aromatic ring, thereby resulting in improvement in initial rise of triboelectric charging. The aromatic hydroxycarboxylic acid compound is contained in an amount of preferably from 20 to 100% by mol, more preferably from 30 to 100% by mol, even more preferably from 40 to 90% by mol, and still even more preferably from 40 to 80% by mol, of the carboxylic acid component, from the viewpoint of initial rise in triboelectric charging, storage property and durability of the toner.

The aliphatic dicarboxylic acid compound has preferably 2 to 12 carbon atoms, and more preferably 2 to 10 carbon atoms, from the viewpoint of low-temperature fixing ability. The aliphatic dicarboxylic acid compound includes oxalic acid, malonic acid, maleic acid, fumaric acid, citraconic acid, itaconic acid, glutaconic acid, succinic acid, adipic acid, sebacic acid, azelaic acid, and the like.

Other carboxylic acid compounds include alicyclic dicarboxylic acids such as cyclohexanedicarboxylic acid; tricarboxylic or higher polycarboxylic acids such as trimellitic acid and pyromellitic acid; rosins; rosins modified with fumaric acid, maleic acid, or acrylic acid; aliphatic hydroxycarboxylic acids having a total number of hydroxy group or groups and carboxyl group or groups of 3 or less; and the like.

The above-mentioned aliphatic hydroxycarboxylic acid compound and the carboxylic acid component are in a molar ratio, i.e. the aliphatic hydroxycarboxylic acid compound/the carboxylic acid component, of preferably from 0.05 to 1.5, more preferably from 0.1 to 1.0, and even more preferably from 0.1 to 0.5, from the viewpoint of durability of the toner.

The alcohol component may properly contain a monohydric alcohol, and the carboxylic acid component may properly contain a monocarboxylic acid compound, from the viewpoint of adjusting molecular weight of the resin and improving offset resistance of the toner.

A total number of moles of hydroxy group or groups and a total number of moles of carboxyl group or groups, contained in the aliphatic hydroxycarboxylic acid compound, the alcohol component, and the carboxylic acid component, i.e. a total number of moles of hydroxy group or groups/a total number of moles of carboxyl group or groups, are in a molar ratio of preferably exceeding 1.0 and equal to or less than 1.8, more preferably exceeding 1.0 and equal to or less than 1.6, and even more preferably from 1.1 to 1.5, from the viewpoint of controlling reactivity percentage of the hydroxycarboxylic acid component, thereby improving durability and triboelectric chargeability under high-temperature, high-humidity conditions of the toner.

It is preferable that the polycondensation reaction of the aliphatic hydroxycarboxylic acid compound, the alcohol component and the carboxylic acid component can be carried out, for example, in an inert gas atmosphere in the presence of an esterification catalyst such as a tin compound or a titanium compound, a polymerization inhibitor or the like, and that the temperature conditions are preferably from 120° to 250° C., and more preferably from 140° to 230° C.

The order of the reactions of the polycondensation reactions of the aliphatic hydroxycarboxylic acid compound, the alcohol component containing an aliphatic diol having a hydroxyl group bound to a secondary carbon atom, and the carboxylic acid component may be in any order. It is preferable that the order is preferably such that the above-mentioned alcohol component and the carboxylic acid component are polycondensed, and thereafter the above-mentioned aliphatic hydroxycarboxylic acid compound is added to a reaction system, and the components are polycondensed, from the viewpoint of improving durability. Therefore, it is preferable that the polyester for a toner of the present invention is obtained by a method including the following steps 1 and 2:

step 1: polycondensing an alcohol component containing an aliphatic diol having a hydroxyl group bound to a secondary carbon atom and a carboxylic acid component; and step 2: adding, during the polycondensation reaction or after the polycondensation reaction of the step 1, an aliphatic hydroxycarboxylic acid compound, and polycondensing the components.

In the step 1, the polycondensation reaction of the alcohol component and the carboxylic acid component can be carried out, for example, in an inert gas atmosphere in the presence of an esterification catalyst such as a tin compound or a titanium compound, and the temperature is preferably from 170° to 250° C., and more preferably from 180° to 230° C.

In the step 2, it is desired that the aliphatic hydroxycarboxylic acid compound is added to a reaction system at a time point at which water is discharged in an amount of preferably from 50 to 100%, more preferably from 60 to 100%, and even more preferably from 70 to 95%, assuming that the reactivity percentage at completion of discharge of a theoretical reaction water in the polycondensation reaction in the step 1 is 100%, from the viewpoint of being capable of suppressing the reaction of the aliphatic hydroxycarboxylic acid compounds themselves, thereby improving durability.

In addition, the reaction temperature in the step 2 is preferably from 120° to 200° C., and more preferably from 140° to 190° C., from the viewpoint of the reaction control of the aliphatic hydroxycarboxylic acid compound. At this reaction temperature, the reaction of the aliphatic hydroxycarboxylic acid compounds themselves can be suppressed, so that durability can be improved.

As the tin compound to be used as an esterification catalyst, for example, dibutyltin oxide is known; however, in the present invention, tin(II) compounds without containing a Sn—C bond are preferred from the viewpoint of excellent dispersibility in the polyester.

As the tin(II) compound without containing a Sn—C bond, a tin(II) compound having a Sn—O bond, a tin(II) compound having a Sn—X bond, wherein X is a halogen atom, or the like is preferable, and the tin(II) compound having a Sn—O bond is more preferable.

The tin(II) compound having a Sn—O bond includes tin (II) carboxylates having a carboxylate group having 2 to 28 carbon atoms, such as tin(II) oxalate, tin(II) acetate, tin(II) octanoate, tin(II) 2-ethylhexanoate, tin(II) laurate, tin(II) stearate, and tin(II) oleate; alkoxy tin(II) compound having an alkoxy group having 2 to 28 carbon atoms, such as octyloxy tin(II), lauroxy tin(II), stearoxy tin(II), and oleyloxy tin(II); tin(II) oxide; tin(II) sulfate; and the like. The tin(II) having a Sn—X bond, wherein X is a halogen atom, includes tin(II) halides, such as tin(II) chloride and tin(II) bromide, and the like. Among them, a fatty acid tin(II) represented by $(R^2COO)_2Sn$, wherein $R^2$ is an alkyl group or an alkenyl group having 5 to 19 carbon atoms, an alkoxy tin(II) represented by $(R^3O)_2Sn$, wherein $R^3$ is an alkyl group or alkenyl group having 6 to 20 carbon atoms, and tin(II) oxide represented by SnO are preferable; the fatty acid tin(II) represented by $(R^2COO)_2Sn$ and tin oxide (H) are more preferable; tin(II) octanoate, tin(II) 2-ethylhexanoate, tin(II) stearate, and tin (II) oxide are even more preferable, from the viewpoint of catalytic ability.

The titanium compound is preferably a titanium compound having a Ti—O bond, and more preferably a titanium compound having an alkoxy group having a total of 1 to 28 carbon atoms, an alkenyloxy group having a total of 2 to 28 carbon atoms, or an acyloxy group having a total of 1 to 28 carbon atoms.

Specific examples of the titanium compound include titanium diisopropylate bis(triethanolaminate) $[Ti(C_6H_{14}O_3N)_2(C_3H_7O)_2]$, titanium diisopropylate bis(diethanolaminate) $[Ti(C_4H_{10}O_2N)_2(C_3H_7O)_2]$, titanium dipentylate bis(triethanolaminate) $[Ti(C_6H_{14}O_3N)_2(C_5H_{11}O)_2]$, titanium diethylate bis(triethanolaminate) $[Ti(C_6H_{14}O_3N)_2(C_2H_5O)_2]$, titanium dihydroxyoctylate bis(triethanolaminate) $[Ti(C_6H_{14}O_3N)_2(OHC_8H_{16}O)_2]$, titanium distearate bis(triethanolaminate) $[Ti(C_6H_{14}O_3N)_2(C_{18}H_{37}O)_2]$, titanium triisopropylate triethanolaminate $[Ti(C_6H_{14}O_3N)(C_3H_7O)_3]$, titanium monopropylate tris(triethanolaminate) $[Ti(C_6H_{14}O_3N)_3(C_3H_7O)]$, and the like. Among them, titanium diisopropylate bis(triethanolaminate), titanium diisopropylate bis(diethanolaminate) and titanium dipentylate bis(triethanolaminate) are preferable, which are available as marketed products, for example, of Matsumoto Trading Co., Ltd.

Specific examples of other preferred titanium compounds include tetra-n-butyl titanate $[Ti(C_4H_9O)_4]$, tetrapropyl titanate $[Ti(C_3H_7O)_4]$, tetrastearyl titanate $[Ti(C_{18}H_{37}O)_4]$, tetramyristyl titanate $[Ti(C_{14}H_{29}O)_4]$, tetraoctyl titanate $[Ti(C_8H_{17}O)_4]$, dioctyl dihydroxyoctyl titanate $[Ti(C_8H_{17}O)_2(OHC_8H_{16}O)_2]$, dimyristyl dioctyl titanate $[Ti(C_{14}H_{29}O)_2(C_8H_{17}O)_2]$, and the like. Among them, tetrastearyl titanate, tetramyristyl titanate, tetraoctyl titanate and dioctyl dihydroxyoctyl titanate are preferable. These titanium compounds can be obtained by, for example, reacting a titanium halide with a corresponding alcohol, or are also available as marketed products of Nisso, or the like.

The above-mentioned tin (II) compounds and titanium compounds can be used alone or in combination with two or more kinds.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the alcohol component, the carboxylic acid component, and the above-mentioned aliphatic hydroxycarboxylic acid compound used.

In the present invention, it is preferable that a pyrogallol compound having a benzene ring of which three hydrogen atoms bound to carbon atoms adjacent to each other are substituted by hydroxyl groups is used as a promoter together with an esterification catalyst, from the viewpoint of improving durability of the toner.

The pyrogallol compound includes pyrogallol, pyrogallic acid, pyrogallic acid esters, benzophenone derivatives such as 2,3,4-trihydroxybenzophenone and 2,2',3,4-tetrahydroxybenzophenone, catechin derivatives such as epigallocatechin and epigallocatechin gallate, and the like. Among them, a compound represented by the formula (II):

(II)

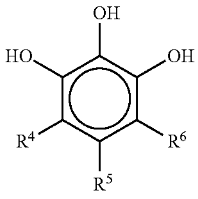

wherein each of $R^4$ to $R^6$ is independently a hydrogen atom or —$COOR^7$, wherein $R^7$ is a hydrogen atom or a hydrocarbon group having 1 to 12 carbon atoms, preferably an alkyl group having 1 to 12 carbon atoms or an alkenyl group having 2 to 12 carbon atoms, is preferable, from the viewpoint of durability of the resin obtained. In the formula, the hydrocarbon group of $R^7$ has preferably 1 to 8 carbon atoms, and more preferably 1 to 4 carbon atoms, from the viewpoint of reaction activity. Among the compounds represented by the formula (II), a compound where each of $R^4$ and $R^6$ is a hydrogen atom, and $R^5$ is a hydrogen atom or —$COOR^7$ is more preferable. Specific examples include pyrogallol ($R^4$ to $R^6$: hydrogen atoms), pyrogallic acid ($R^4$ and $R^6$: hydrogen atoms, $R^5$: —COOH), pyrogallic acid esters, such as ethyl pyrogallate ($R^4$ and $R^6$: hydrogen atoms, $R^5$: —$COOC_2H_5$), propyl pyrogallate ($R^4$ and $R^6$: hydrogen atoms, $R^5$: —$COOC_3H_7$), butyl pyrogallate ($R^4$ and $R^6$: hydrogen atoms, $R^5$: —$COOC_4H_9$), octyl pyrogallate ($R^4$ and $R^6$: hydrogen atoms, $R^5$: —$COOC_8H_{17}$), and lauryl pyrogallate ($R^4$ and $R^6$: hydrogen atoms, $R^5$: —$COOC_{12}H_{25}$), and the like. Pyrogallic acid and the pyrogallic acid esters are preferred from the viewpoint of storage property of the toner.

The pyrogallol compound is present in the polycondensation reaction in an amount of preferably from 0.001 to 1.0 part by weight, more preferably from 0.005 to 0.4 parts by weight, and even more preferably from 0.01 to 0.2 parts by weight, based on 100 parts by weight of a total amount of the alcohol component, the carboxylic acid component, and the above-mentioned aliphatic hydroxycarboxylic acid compound used, from the viewpoint of storage property of the toner. The amount of pyrogallol compound present as referred to herein means an entire formulation amount of pyrogallol compounds used in the polycondensation reaction.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. the pyrogallol compound/the esterification catalyst, is preferably from 0.01 to 0.5, more preferably from 0.03 to 0.3, and even more preferably from 0.05 to 0.2, from the viewpoint of storage property of the toner.

Here, the polyester may contain a polyester modified to an extent that the properties are substantially not impaired. The modified polyester refers to a polyester-polyamide, or a polyester grafted or blocked with phenol, urethane, epoxy, or the like according to a method described in Japanese Patent Laid-Open No. Hei-11-133668, Hei-10-239903, Hei-8-20636 or the like.

In addition, the polyester may be a composite resin containing a polyester and an addition polymerization resin such as a vinyl resin. The composite resin may be a mixture that contains a polyester and an addition polymerization resin. For example, the composite resin can be obtained by polymerizing raw material monomers for a polyester and raw material monomers for an addition polymerization resin in the same reaction vessel.

It is preferable that the composite resin is a hybrid resin obtainable by using a dually reactive monomer capable of reacting with both of the raw material monomers for a polyester and the raw material monomers for an addition polymerization resin, whereby the addition polymerization resin component is dispersed more finely and homogeneously in the polyester component. The dually reactive monomer is a compound having in its molecule an ethylenically unsaturated bond, and at least one functional group selected from the group consisting of a hydroxyl group, a carboxyl group, an epoxy group, a primary amino group and a secondary amino group, preferably a hydroxyl group and/or a carboxyl group, and more preferably a carboxyl group. The dually reactive monomer is preferably acrylic acid, methacrylic acid, fumaric acid or the like.

The polyester for a toner of the present invention has a softening point of preferably from 85° to 160° C., more preferably from 90° to 150° C., and even more preferably from 95° to 145° C., from the viewpoint of fixing ability, storage property and durability of the toner.

In a case where the polyester is used as a resin binder, it is preferable that the polyester contains a high-softening point resin and a low-softening point resin, the softening points of which have a difference of preferably 10° C. or more, and more preferably from 20° to 60° C., from the viewpoint of low-temperature fixing ability, hot offset resistance and durability of the toner. The high-softening point resin has a softening point of preferably from 125° to 160° C., and more preferably from 130° to 150° C., from the viewpoint of low-temperature fixing ability, hot offset resistance and durability of the toner. The low-softening point resin has a softening point of preferably from 90° to 120° C., and more preferably from 90° to 110° C., from the viewpoint of low-temperature fixing ability, hot offset resistance and durability of the toner. The weight ratio of the high-softening point resin to the low-softening point resin, i.e. high-softening point resin/low-softening point resin, is preferably from 1/3 to 3/1, and more preferably from 1/2 to 2/1, from the viewpoint of low-temperature fixing ability, hot offset resistance and durability of the toner.

It is preferable that the resin binder of the present invention described later contains the polyester of the present invention as a high-softening point resin, from the viewpoint of low-temperature fixing ability, hot offset resistance and durability of the toner. In that case, although the low-softening point resin does not have to be the polyester of the present invention, it is more preferable that the resin binder of the present invention contains the polyester of the present invention as a high-softening point resin and a low-softening point resin, from the viewpoint of low-temperature fixing ability, hot offset resistance and durability of the toner.

The glass transition temperature is preferably from 45° to 80° C., and more preferably from 50° to 70° C., from the viewpoint of fixing ability, storage property and durability of the toner.

From the viewpoint of initial rise in triboelectric charging, the acid value is preferably from 5 to 90 mgKOH/g, more preferably from 10 to 80 mgKOH/g, and even more preferably from 10 to 70 mgKOH/g.

By using the resin binder containing a polyester of the present invention, a toner for electrophotography having excellent low-temperature fixing ability, hot offset resistance and durability of the toner, is obtained.

In the resin binder of the present invention, a known resin binder, for example, other resins including a vinyl resin such as styrene-acrylic resin, an epoxy resin, a polycarbonate, or a polyurethane may be used together within the range that would not impair the effects of the present invention. The polyester of the present invention is contained in an amount of preferably 70% by weight or more, more preferably 80% by weight or more, even more preferably 90% by weight or more, and even more preferably substantially 100% by weight, of the resin binder.

The toner of the present invention may further properly contain an additive such as a colorant, a releasing agent, a charge control agent, a charge control resin, a magnetic powder, a fluidity improver, an electric conductivity modifier, an extender pigment, a reinforcing filler such as a fibrous material, an antioxidant, an anti-aging agent, or a cleanability improver.

As the colorant, all of the dyes, pigments and the like which are used as colorants for toners can be used, and carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like can be used. The toner of the present invention may be any of black toner and color toner. The colorant is contained in an amount of preferably from 1 to 40 parts by weight, and more preferably from 2 to 10 parts by weight, based on 100 parts by weight of the resin binder.

The releasing agent includes waxes including polyolefin waxes, paraffin waxes, and silicones; fatty acid amides, such as oleic acid amide, erucic acid amide, ricinoleic acid amide, and stearic acid amide; vegetable waxes, such as carnauba wax, rice wax, candelilla wax, wood wax, and jojoba oil; animal waxes, such as beeswax; and mineral and petroleum waxes, such as montan wax, ozokerite, ceresin, microcrystalline wax, and Fischer-Tropsch wax. These releasing agents can be used alone, or in a mixture of two or more kinds.

The releasing agent has a melting point of preferably from 60° to 160° C., and more preferably from 60° to 150° C., from the viewpoint of low-temperature fixing ability and offset resistance of the toner.

The releasing agent is contained in an amount of preferably from 0.5 to 10 parts by weight, more preferably from 1 to 8 parts by weight, and even more preferably from 1.5 to 7 parts by weight, based on 100 parts by weight of the resin binder, from the viewpoint of dispersibility of the releasing agent in the resin binder.

The charge control agent is not particularly limited, and the charge control agent may contain any one of positively chargeable charge control agents and negatively chargeable charge control agents.

The positively chargeable charge control agent includes Nigrosine dyes, for example, "Nigrosine Base EX," "Oil Black BS," "Oil Black SO," "BONTRON N-01," "BONTRON N-07," "BONTRON N-09," "BONTRON N-11"

(hereinabove manufactured by Orient Chemical Co., Ltd.), and the like; triphenylmethane-based dyes containing a tertiary amine as a side chain; quaternary ammonium salt compounds, for example, "BONTRON P-51" (manufactured by Orient Chemical Co., Ltd.), cetyltrimethylammonium bromide, "COPY CHARGE PX VP435" (manufactured by Hoechst), and the like; polyamine resins, for example, "AFP-B" (manufactured by Orient Chemical Co., Ltd.), and the like; imidazole derivatives, for example, "PLZ-2001," "PLZ-8001" (hereinabove manufactured by SHIKOKU CHEMICAL CORPORATION), and the like.

In addition, the negatively chargeable charge control agent includes metal-containing azo dyes, for example, "VARIFAST BLACK 3804," "BONTRON S-31" (hereinabove manufactured by Orient Chemical Co., Ltd.), "T-77" (manufactured by Hodogaya Chemical Co., Ltd.), "BONTRON S-32," "BONTRON S-34," "BONTRON S-36," (hereinabove manufactured by Orient Chemical Co., Ltd.), "AIZEN SPILON BLACK TRH" (manufactured by Hodogaya Chemical Co., Ltd.), and the like; metal compounds of benzilic acid compounds, for example, "LR-147," "LR-297" (hereinabove manufactured by Japan Carlit, Ltd.), and the like; metal compounds of salicylic acid compounds, for example, "BONTRON E-81," "BONTRON E-84," "BONTRON E-88," "E-304" (hereinabove manufactured by Orient Chemical Co., Ltd.), and the like; "TN-105" (manufactured by Hodogaya Chemical Co., Ltd.); copper phthalocyanine dyes; quaternary ammonium salts, for example, "COPY CHARGE NX VP434" (manufactured by Hoechst), and the like; nitroimidazole derivatives; organometallic compounds, for example, "TN-105" (manufactured by Hodogaya Chemical Co., Ltd.); and the like.

The charge control agent is contained in an amount of preferably from 0.01 to 10 parts by weight, more preferably from 0.01 to 5 parts by weight, even more preferably from 0.3 to 3 parts by weight, still even more preferably from 0.5 to 3 parts by weight, and still even more preferably from 1 to 2 parts by weight, based on 100 parts by weight of the resin binder, from the viewpoint of initial rise in triboelectric charging of the toner.

In the present invention, it is preferable that a charge control resin is contained in order to improve triboelectric chargeability. The charge control resin is preferably a styrenic resin. A quaternary ammonium salt group-containing styrenic resin is preferred, from the viewpoint of exhibiting positive chargeability of the toner, and a sulfonic acid group-containing styrenic resin is preferred, from the viewpoint of exhibiting negative chargeability of the toner.

The quaternary ammonium salt group-containing styrenic resin is more preferably a quaternary ammonium salt group-containing styrene-acrylic resin obtained by the polymerization of a monomer mixture containing a monomer represented by the formula (IIIa):

(IIIa)

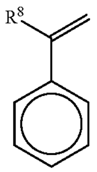

wherein $R^8$ is a hydrogen atom or a methyl group;
a monomer represented by the formula (IIIb):

(IIIb)

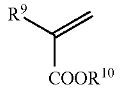

wherein $R^9$ is a hydrogen atom or a methyl group, and $R^{10}$ is an alkyl group having 1 to 12 carbon atoms;
a monomer represented by the formula (IIIc):

(IIIc)

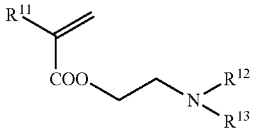

wherein $R^{11}$ is a hydrogen atom or a methyl group, and each of $R^{12}$ and $R^{13}$ is an alkyl group having 1 to 4 carbon atoms,
or a quaternary compound thereof. The monomers may be previously subjected to formation of quaternary compounds, or the formation of quaternary compounds may be carried out after the polymerization. A quaternary compound-forming agent includes alkyl halides such as methyl chloride and methyl iodide, diethyl sulfate, di-n-propyl sulfate, and the like.

The monomer represented by the formula (IIIc) is preferably a styrene in which $R^8$ is a hydrogen atom, and the monomer represented by the formula (IIIb) is a monomer in which $R^9$ is preferably a hydrogen atom and $R^{10}$ is an alkyl group having preferably from 1 to 6 carbon atoms, and more preferably from 1 to 4 carbon atoms. Specific examples of the monomer represented by the formula (IIIb) include butyl acrylate, 2-ethylhexyl acrylate, and the like. The monomer represented by the formula (IIIc) is preferably a monomer in which $R^{11}$ is a methyl group, and $R^{12}$ and $R^{13}$ are a methyl group or an ethyl group, and the monomer is more preferably dimethylaminoethyl methacrylate in which $R^{11}$, $R^{12}$ and $R^{13}$ are a methyl group, each being desirable.

In the quaternary ammonium salt group-containing styrenic resin, it is desirable that the monomer represented by the formula (IIIa) is contained in an amount of preferably from 60 to 97% by weight, and more preferably from 70 to 90% by weight, of the monomer mixture, that the monomer represented by the formula (IIIb) is contained in an amount of preferably from 1 to 33% by weight, and more preferably from 5 to 20% by weight, of the monomer mixture, and that the monomer represented by the formula (IIIc) or a quaternary compound thereof is contained in an amount of preferably from 2 to 35% by weight, and more preferably from 5 to 20% by weight, of the monomer mixture.

Specific examples of the quaternary ammonium salt group-containing styrenic resin obtained from the monomers represented by the formulae (IIIa) to (IIIc) include butyl acrylate/N,N-diethyl-N-methyl-2-(methacryloyloxy)ethyl ammonium/styrene copolymers, and the like.

It is preferable that the sulfonic acid group-containing styrenic resin is a sulfonic acid group-containing styrenic resin obtained by polymerizing a monomer mixture containing a monomer represented by the formula (IIIa), a monomer represented by the formula (IIIb), as mentioned above, and a sulfonic acid group-containing monomer.

The sulfonic acid group-containing monomer includes (meth)allylsulfonic acid, 2-(meth)acrylamide-2-methylpropanesulfonic acid, and styrenesulfonic acid. Specific examples of the sulfonic acid group-containing monomer include 2-ethylhexyl acrylate/2-acrylamide-2-methyl-1-propanesulfonic acid/styrene copolymers, and the like.

In the sulfonic acid group-containing styrenic resin, it is desirable that the monomer represented by the formula (Ma) is contained in an amount of preferably from 60 to 97% by weight, and more preferably from 70 to 90% by weight, of the monomer mixture, that the monomer represented by the formula (IIIb) is contained in an amount of preferably from 1 to 33% by weight, and more preferably from 5 to 20% by weight, of the monomer mixture, and that the sulfonic acid group-containing monomer is contained in an amount of preferably from 2 to 35% by weight, and more preferably from 5 to 20% by weight, of the monomer mixture.

In both of the quaternary ammonium salt group-containing styrenic resin and the sulfonic acid group-containing styrenic resin, the polymerization of the monomer mixture can be carried out by, for example, heating a monomer mixture to 50° to 100° C. in an inert gas atmosphere in the presence of a polymerization initiator such as azobisdimethylvaleronitrile. Here, the polymerization method may be any of solution polymerization, suspension polymerization, or bulk polymerization, and preferably solution polymerization.

The styrenic resin has a softening point of preferably from 100° to 140° C., and more preferably from 110° to 130° C., from the viewpoint of low-temperature fixing ability of the toner.

The styrenic resin contained as a charge control resin is used in an amount of preferably from 3 to 40 parts by weight, more preferably from 4 to 30 parts by weight, and even more preferably from 5 to 20 parts by weight, based on 100 parts by weight of the resin binder, from the viewpoint of exhibiting triboelectric chargeability of the toner.

The toner of the present invention may be a toner obtained by any of conventionally known methods such as a melt-kneading method, an emulsion phase-inversion method, and a polymerization method, and a pulverized toner produced by the melt-kneading method is preferable, from the viewpoint of productivity and dispersibility of a colorant. In the case of a pulverized toner produced by a melt-kneading method, for example, a toner can be produced by homogeneously mixing raw materials such as a resin binder, a colorant, and a charge control agent, with a mixer such as a Henschel mixer, thereafter melt-kneading the mixture with a closed kneader, a single-screw or twin-screw extruder, an open roller-type kneader, or the like, cooling, pulverizing, and classifying the product. On the other hand, a toner produced by the polymerization method is preferable, from the viewpoint of forming a toner having a small particle size.

The toner of the present invention has a volume-median particle size ($D_{50}$) of preferably from 3 to 15 μm, and more preferably from 3 to 10 μm. Here, the volume-median particle size ($D_{50}$) as used herein means a particle size at 50% counting from smaller particle sizes in a cumulative volume frequency calculated in volume percentage.

In the toner of the present invention, it is preferable that fine inorganic particles are used as an external additive for improving transferability. Specific examples preferably include one or more members selected from the group consisting of silica, alumina, titania, zirconia, tin oxide, and zinc oxide. Among them, silica is preferred, and it is more preferable to contain a silica having a small specific gravity, from the viewpoint of preventing embedment.

The silica is preferably a hydrophobic silica that is hydrophobically treated, from the viewpoint of transferability of the toner.

It is preferable that the method of subjecting silica to a hydrophobic treatment includes the step of modifying of a silanol group on the surface of the silica particles with a hydrophobic group, such as an alkylsilyl group having 1 to 12 carbon atoms, for example, a methylsilyl group, a hexylsilyl group, or the like, or coating the surface with a hydrophobic resin.

The hydrophobic treatment agent for hydrophobically treating the surface of silica particles is exemplified by organochlorosilane, organoalkoxysilane, organodisilazane, cyclic organopolysilazane, linear organopolysiloxane and the like, and specifically include hexamethyldisilazane (HMDS), dimethyldichlorosilane (DMDS), a silicone oil, octyltriethoxysilane (OTES), methyltriethoxysilane, and the like. Among them, dimethyldichlorosilane is preferred.

A method of substituting a silanol group on the surface of silica particles with a hydrophobic group such as an alkylsilyl group includes, for example, a method of reacting a water-dispersed silica colloid with an alkali metal salt of an alkylsilanol (see, Japanese Examined Patent Publication No. Hei-7-33250 or the like); a method of adding an organic solvent, a cationic surfactant and an alkyltrialkoxysilane to a water-dispersed silica colloid, thereafter subjecting the mixture to an azeotropic dehydration, and then further heating the residue under reflux (see, Japanese Patent Laid-Open No. Hei-6-73389); a method of treating a wet silica or dry silica with an alkyltrialkoxysilane, an organosilicon halide compound, or the like (see, Japanese Patent Laid-Open Nos. Hei-6-206720, Hei-7-187647, and the like), and the like.

In the silica that is hydrophobically treated, at least a part of silanol groups on the surface of silica particles of which is substituted with a hydrophobic group, it is desirable that the silanol groups on the surface of silica particles are substituted with hydrophobic groups in a ratio of preferably 5% by mol or more, more preferably 10% by mol or more, and even more preferably 20% by mol or more.

Here, since the silanol group on the surface of silica particles is capable of ionically adsorbing an amino group or imino group, the percentage of the silanol groups modified by the above-mentioned hydrophobic groups can be known by, for example, measuring amounts of di-n-butylamine adsorbed to the silica before the modification reaction and after the modification. It is preferable that the treatment amount of the hydrophobically treating agent is from 1 to 7 $mg/m^2$ per surface area of the silica.

The external additive has an average particle size of from 10 to 250 nm, preferably from 10 to 200 nm, and more preferably from 15 to 90 nm, from the viewpoint of triboelectric chargeability, fluidity, and transferability of the toner.

The external additive is contained in an amount of preferably from 0.05 to 5 parts by weight, more preferably from 0.1 to 3 parts by weight, and even more preferably from 0.3 to 3 parts by weight, based on 100 parts by weight of the toner particles before the treatment with the external additive.

The toner of the present invention can be used as a toner for monocomponent development, or a two-component developer prepared by mixing the toner with a carrier.

EXAMPLES

The following examples further describe and demonstrate embodiments of the present invention. The examples are given solely for the purposes of illustration and are not to be construed as limitations of the present invention.

[Softening Point of Resins]

The softening point refers to a temperature at which a half of the sample flows out, when plotting a downward movement of a plunger of a flow tester (Shimadzu Corporation, "CFT-500D"), against temperature, in which a sample is prepared by applying a load of 1.96 MPa thereto with the plunger using the flow tester and extruding a 1 g sample through a nozzle having a die pore size of 1 mm and a length of 1 mm, while heating the sample at a heating rate of 6° C./min.

[Glass Transition Temperature of Resins]

The glass transition temperature refers to a temperature of an intersection of the extension of the baseline of equal to or lower than the temperature of the maximum endothermic peak and the tangential line showing the maximum inclination between the kick-off of the peak and the top of the peak, which is determined using a differential scanning calorimeter (manufactured by Seiko Instruments, Inc., "DSC 210") of a sample of which temperature is heated at a rate of 10° C./min., the sample prepared by measuring out a sample in an amount of from 0.01 to 0.02 g on an aluminum pan, raising its temperature to 200° C., and cooling the sample from that temperature to 0° C. at a cooling rate of 10° C./min.

[Acid Value of Resins]

The acid value is measured as prescribed by a method of JIS K0070, provided that only a measurement solvent is changed from a mixed solvent of ethanol and ether as prescribed in JIS K0070 to a mixed solvent of acetone and toluene (acetone:toluene=1:1 (volume ratio)).

[Hydroxyl Value of Resins]

The hydroxyl value is measured as prescribed by a method of JIS K0070.

[Melting Point of Releasing Agent]

A temperature of maximum endothermic peak obtained by raising the temperature of a sample at a rate of 10° C./min., the sample prepared by raising the temperature of a sample to 200° C. using a differential scanning calorimeter (manufactured by Seiko Instruments, Inc., "DSC 210"), and cooling the heated sample from that temperature to 0° C. at a cooling rate of 10° C./min., is referred to as a melting point.

[Average Particle Size of External Additive]

The average particle size refers to a number-average particle size, which is an average of particle sizes of 500 particles of the external additive, measured from a photograph taken with a scanning electron microscope (SEM). In a case where the particles have length and breath, it refers to the length.

[Volume-Median Particle Size ($D_{50}$) of Toner]

Measuring Apparatus Coulter Multisizer II (manufactured by Beckman Coulter)

Aperture Diameter: 50 μm

Analyzing Software: Coulter Multisizer AccuComp Ver. 1.19 (manufactured by Beckman Coulter)

Electrolytic Solution: Isotone II (manufactured by Beckman Coulter)

Dispersion: A 5% electrolytic solution of EMULGEN 109P (manufactured by Kao Corporation, polyoxyethylene lauryl ether, HLB: 13.6).

Dispersion Conditions Ten milligrams of a measurement sample is added to 5 ml of the above-mentioned dispersion, the mixture is dispersed for 1 minute with an ultrasonic disperser, and 25 ml of an electrolytic solution is added to the dispersion, and further dispersed with an ultrasonic disperser for 1 minute.

Measurement Conditions To a beaker are added 100 ml of the above-mentioned electrolytic solution and the dispersion, and 30,000 particles are measured at a concentration at which particle sizes of 30,000 particles can be measured in 20 seconds, and a volume-median particle size ($D_{50}$) is obtained from the particle size distribution.

Production Example 1 of Resins

Resins A1 to A7 and A10

A 5-liter four-neck flask equipped with a nitrogen inlet tube, a dehydration tube equipped with a fractional distillation tube through which hot water at 100° C. was allowed to flow, a stirrer, and a thermocouple was charged with an alcohol component, a carboxylic acid component, and an esterification catalyst, as listed in Table 1 or 2, and the mixture was kept at 180° C. for 1 hour in a nitrogen atmosphere, heated from 180° to 230° C. at a rate of 10° C./hr, and then subjected to a polycondensation reaction at 230° C. for 10 hours. Further, after the reactivity percentage reached 80%, an aliphatic hydroxycarboxylic acid compound as listed in Table 1 or 2 was added thereto, and the mixture was subjected to a reaction at 160° C., and subjected to a reaction at 10 kPa until a softening point as listed in Table 1 or 2 was reached, to provide each of polyesters.

Production Example 2 of Resins

Resins A8 and A9

A 5-liter four-neck flask equipped with a nitrogen inlet tube, a dehydration tube equipped with a fractional distillation tube through which hot water at 100° C. was allowed to flow, a stirrer, and a thermocouple was charged with an alcohol component, terephthalic acid, and an esterification catalyst, as listed in Table 2, and the mixture was kept at 180° C. for 1 hour in a nitrogen atmosphere, heated from 180° to 230° C. at a rate of 10° C./hr, and then subjected to a polycondensation reaction at 230° C. for 10 hours. Further, fumaric acid or ferulic acid as listed in Table 2 was added thereto at 180° C., and the mixture was then subjected to a reaction thereat for 5 hours. Subsequently, after the reactivity percentage reached 80%, an aliphatic hydroxycarboxylic acid compound as listed in Table 2 was added thereto, and the mixture was subjected to a reaction at 160° C., and subjected to a reaction at 10 kPa until a softening point as listed in Table 2 was reached, to provide each of polyesters.

Production Example 3 of Resin

Resin A11

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers of polyester other than a crosslinking agent component, and an esterification catalyst, as listed in Table 4, and the mixture was heated to 160° C. in a nitrogen atmosphere. Thereafter, a mixture of a dually reactive monomer (acrylic acid), raw material monomers of a vinyl resin and a polymerization initiator as listed in Table 4 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. Finally, after the reactivity percentage reached 80%, an aliphatic hydroxycarboxylic acid compound as listed in Table 4 was supplied thereto, and the mixture was subjected to a reaction at 160° C.

and 10 kPa until a softening point as listed in Table 4 was reached, to provide a hybrid resin.

Production Example 4 of Resins

Resins A12 to A16

A 5-liter four-neck flask equipped with a dehydration tube equipped with a nitrogen inlet tube, a stirrer, and a thermocouple was charged with an alcohol component, a carboxylic acid component, and an esterification catalyst, as listed in Table 2 or 3, and the mixture was subjected to a polycondensation reaction at 230° C. for 10 hours in a nitrogen atmosphere, and further subjected to a reaction at 230° C. and 8.0 kPa for 1 hour. Further, after the reactivity percentage reached 80%, lactic acid, salicylic acid, glycerol, trimellitic anhydride or citric acid as listed in Table 2 or 3 was added thereto, and the mixture was subjected to a reaction at 200° C., and subjected to a reaction at 10 kPa until a softening point as listed in Table 2 or 3 was reached, to provide each of polyesters.

Production Example 5 of Resin

Resin A17

A 5-liter four-neck flask equipped with a nitrogen inlet tube, a dehydration tube equipped with a fractional distillation tube through which hot water at 100° C. was allowed to flow, a stirrer, and a thermocouple was charged with an alcohol component, a carboxylic acid component, and an esterification catalyst, as listed in Table 3, and the mixture was kept at 180° C. for 1 hour in a nitrogen atmosphere, heated from 180° to 230° C. at a rate of 10° C./hr, and then subjected to a polycondensation reaction at 230° C. for 10 hours. The mixture was subjected to a reaction at 10 kPa until a softening point as listed in Table 3 was reached, to provide a polyester.

TABLE 1

| | Resin A1 Amount Used | | | Resin A2 Amount Used | | | Resin A3 Amount Used | | | Resin A4 Amount Used | | |
|---|---|---|---|---|---|---|---|---|---|---|---|---|
| | g | mol | molar ratio | g | mol | molar ratio | g | mol | molar ratio | g | mol | molar ratio |
| Alcohol Component | | | | | | | | | | | | |
| 1,2-Propanediol | 1140 | 15 | 100 | 1140 | 15 | 100 | 1140 | 15 | 100 | 1140 | 15 | 100 |
| 2,3-Butanediol | — | — | — | — | — | — | — | — | — | — | — | — |
| Carboxylic Acid Component | | | | | | | | | | | | |
| Terephthalic Acid | 1743 | 10.5 | 70 | 1743 | 10.5 | 70 | 1743 | 10.5 | 70 | 1743 | 10.5 | 70 |
| Alkenylsuccinic Anhydride[1] | — | — | — | — | — | — | — | — | — | — | — | — |
| Aliphatic Hydroxycarboxylic Acid Compound | | | | | | | | | | | | |
| Citric Acid | 576 | 3 | 20 | 288 | 1.5 | 10 | 576 | 3 | 20 | — | — | — |
| Tartaric Acid | — | — | — | — | — | — | — | — | — | 450 | 3 | 20 |
| Esterification Catalyst (including promoter) | | | | | | | | | | | | |
| Tin(II) 2-Ethylhexanoate | 17.3 | — | — | 15.9 | — | — | 17.3 | — | — | 16.7 | — | — |
| Pyrogallic Acid | 1.7 | — | — | 1.6 | — | — | 1.7 | — | — | 1.7 | — | — |
| Total number of moles of OH group or groups/ Total number of moles of COOH group or groups | | 1.1 | | | 1.2 | | | 1.1 | | | 1.3 | |
| Softening Point (° C.) | | 140.6 | | | 98.2 | | | 120.5 | | | 116.8 | |
| Glass Transition Temp. (° C.) | | 61.6 | | | 54.3 | | | 58.9 | | | 60.4 | |
| Acid Value (mgKOH/g) | | 24.3 | | | 31.4 | | | 32.1 | | | 33.9 | |

| | Resin A5 Amount Used | | | Resin A6 Amount Used | | | Resin A7 Amount Used | | |
|---|---|---|---|---|---|---|---|---|---|
| | g | mol | molar ratio | g | mol | molar ratio | g | mol | molar ratio |
| Alcohol Component | | | | | | | | | |
| 1,2-Propanediol | 570 | 7.5 | 50 | 1140 | 15 | 100 | 1140 | 15 | 100 |
| 2,3-Butanediol | 675 | 7.5 | 50 | — | — | — | — | — | — |
| Carboxylic Acid Component | | | | | | | | | |
| Terephthalic Acid | 1743 | 10.5 | 70 | 996 | 6 | 40 | 1494 | 9 | 60 |
| Alkenylsuccinic Anhydride[1] | — | — | — | — | — | — | 402 | 1.5 | 10 |
| Aliphatic Hydroxycarboxylic Acid Compound | | | | | | | | | |
| Citric Acid | 576 | 3 | 20 | 1152 | 6 | 40 | 576 | 3 | 20 |
| Tartaric Acid | — | — | — | — | — | — | — | — | — |
| Esterification Catalyst (including promoter) | | | | | | | | | |
| Tin(II) 2-Ethylhexanoate | 17.8 | — | — | 16.4 | — | — | 18.1 | — | — |
| Pyrogallic Acid | 1.8 | — | — | 1.6 | — | — | 1.8 | — | — |

TABLE 1-continued

| | | | |
|---|---|---|---|
| Total number of moles of OH group or groups/ Total number of moles of COOH group or groups | 1.1 | 1.2 | 1.1 |
| Softening Point (° C.) | 115.4 | 120.4 | 116.9 |
| Glass Transition Temp. (° C.) | 66.2 | 54.7 | 50.7 |
| Acid Value (mgKOH/g) | 35.3 | 58.4 | 35.4 |

1) Alkenylsuccinic anhydride: An alkenylsuccinic anhydride described in paragraph [0066] of Japanese Patent Laid-Open No. 2007-248582 (average molecular weight: 268)

TABLE 2

| | Resin A8 Amount Used | | | Resin A9 Amount Used | | | Resin A10 Amount Used | | | Resin A12 Amount Used | | |
|---|---|---|---|---|---|---|---|---|---|---|---|---|
| | g | mol | molar ratio | g | mol | molar ratio | g | mol | molar ratio | g | mol | molar ratio |
| Alcohol Component | | | | | | | | | | | | |
| 1,2-Propanediol | 1140 | 15 | 100 | 1140 | 15 | 100 | 1140 | 15 | 100 | 1140 | 15 | 100 |
| Carboxylic Acid Component | | | | | | | | | | | | |
| Terephthalic Acid | 1494 | 9 | 60 | 1245 | 7.5 | 50 | 1743 | 10.5 | 70 | 1743 | 10.5 | 70 |
| Fumaric Acid | 174 | 1.5 | 10 | — | — | — | — | — | — | — | — | — |
| Ferulic Acid | — | — | — | 1164 | 6 | 40 | — | — | — | — | — | — |
| Aliphatic Hydroxycarboxylic Acid Compound | | | | | | | | | | | | |
| Citric Acid | 576 | 3 | 20 | 576 | 3 | 20 | 576 | 3 | 20 | — | — | — |
| Lactic Acid | — | — | — | — | — | — | — | — | — | 135 | 1.5 | 10 |
| Salicylic Acid | — | — | — | — | — | — | — | — | — | — | — | — |
| Glycerol | — | — | — | — | — | — | — | — | — | — | — | — |
| Trimellitic Anhydride | — | — | — | — | — | — | — | — | — | — | — | — |
| Esterification Catalyst (including promoter) | | | | | | | | | | | | |
| Tin(II) 2-Ethylhexanoate | 16.9 | — | — | 20.6 | — | — | — | — | — | 15.1 | — | — |
| Pyrogallic Acid | 1.7 | — | — | 2.1 | — | — | 1.7 | — | — | 1.5 | — | — |
| Titanium Catalyst[1] | — | — | — | — | — | — | 17.3 | — | — | — | — | — |
| Total number of moles of OH group or groups/ Total number of moles of COOH group or groups | | 1.1 | | | 1.3 | | | 1.1 | | | 1.4 | |
| Softening Point (° C.) | | 118.5 | | | 117.4 | | | 116.8 | | | 103.6 | |
| Glass Transition Temp. (° C.) | | 51.6 | | | 56.1 | | | 57.4 | | | 52.1 | |
| Acid Value (mgKOH/g) | | 34.2 | | | 36.1 | | | 35.7 | | | 31.4 | |

| | Resin A13 Amount Used | | | Resin A14 Amount Used | | | Resin A15 Amount Used | | |
|---|---|---|---|---|---|---|---|---|---|
| | g | mol | molar ratio | g | mol | molar ratio | g | mol | molar ratio |
| Alcohol Component | | | | | | | | | |
| 1,2-Propanediol | 1140 | 15 | 100 | 798 | 10.5 | 70 | 1140 | 15 | 100 |
| Carboxylic Acid Component | | | | | | | | | |
| Terephthalic Acid | 1743 | 10.5 | 70 | 1992 | 12 | 80 | 1743 | 10.5 | 70 |
| Fumaric Acid | — | — | — | — | — | — | — | — | — |
| Ferulic Acid | — | — | — | — | — | — | — | — | — |
| Aliphatic Hydroxycarboxylic Acid Compound | | | | | | | | | |
| Citric Acid | — | — | — | — | — | — | — | — | — |
| Lactic Acid | — | — | — | — | — | — | — | — | — |
| Salicylic Acid | 207 | 1.5 | 10 | — | — | — | — | — | — |
| Glycerol | — | — | — | 276 | 3.0 | 20 | — | — | — |
| Trimellitic Anhydride | — | — | — | — | — | — | 288 | 1.5 | 10 |
| Esterification Catalyst (including promoter) | | | | | | | | | |
| Tin(II) 2-Ethylhexanoate | 15.5 | — | — | 9.3 | — | — | 15.9 | — | — |
| Pyrogallic Acid | 1.5 | — | — | 0.9 | — | — | 1.6 | — | — |
| Titanium Catalyst[1] | — | — | — | — | — | — | — | — | — |
| Total number of moles of OH group or groups/ | | 1.4 | | | 1.3 | | | 1.2 | |

TABLE 2-continued

| | | | |
|---|---|---|---|
| Total number of moles of COOH group or groups | | | |
| Softening Point (° C.) | 102.9 | 99.4 | 100.4 |
| Glass Transition Temp. (° C.) | 53.4 | 57.4 | 54.1 |
| Acid Value (mgKOH/g) | 30.1 | 24.9 | 24.3 |

1)Titanium diisopropylate bis(triethanolaminate)

TABLE 3

| | Resin A16 Amount Used | | | Resin A17 Amount Used | | |
|---|---|---|---|---|---|---|
| | g | mol | molar ratio | g | mol | molar ratio |
| Alcohol Component | | | | | | |
| 1,2-Propanediol | — | — | — | 1140 | 15 | 100 |
| Ethylene Glycol | 1240 | 20 | 100 | — | — | — |
| Carboxylic Acid Component | | | | | | |
| Terephthalic Acid | 2324 | 14 | 70 | 1992 | 12 | 80 |
| Aliphatic Hydroxycarboxylic Acid Compound | | | | | | |
| Citric Acid | 1152 | 6 | 30 | — | — | — |
| Esterification Catalyst (including promoter) | | | | | | |
| Tin(II) 2-Ethylhexanoate | 26.4 | — | — | 15.6 | — | — |
| Pyrogallic Acid | 2.6 | — | — | 1.6 | — | — |
| Total number of moles of OH group or groups/Total number of moles of COOH group or groups | | 1.0 | | | 1.3 | |
| Softening Point (° C.) | | 102.3 | | | 97.6 | |
| Glass Transition Temp. (° C.) | | 21.2 | | | 54.2 | |
| Acid Value (mgKOH/g) | | 24.3 | | | 12.3 | |

TABLE 4

| | Resin A11 Amount Used | | |
|---|---|---|---|
| | g | mol | ratio |
| Raw Material Monomers of Polyester (P) | | | molar ratio |
| Alcohol Component | | | |
| 1,2-Propanediol | 1140 | 15 | 100 |
| Carboxylic Acid Component | | | |
| Terephthalic Acid | 1743 | 10.5 | 70 |
| Aliphatic Hydroxycarboxylic Acid Compound | | | |
| Citric Acid | 576 | 3 | 20 |
| Esterification Catalyst (including promoter) | | | |
| Tin(II) 2-Ethylhexanoate | 17.3 | — | — |
| Pyrogallic Acid | 1.7 | — | — |
| Dually Reactive Monomer | | | |
| Acrylic Acid | 55.8 | 0.9 | 6 |
| Raw Material Monomers of Vinyl Resin (V) | | | weight ratio |
| Styrene | 726.4 | — | 84 |
| 2-Ethylhexyl Acrylate | 138.4 | — | 16 |
| Polymerization Initiator1) | | — | |

TABLE 4-continued

| | Resin A11 Amount Used | | |
|---|---|---|---|
| | g | mol | ratio |
| Dibutyl Peroxide | 51.885 | — | 6 |
| Total Weight of P/Total Weight of V (Weight Ratio) | | 4 | |
| Total number of moles of OH group or groups/Total number of moles of COOH group or groups | | 1.1 | |
| Softening Point (° C.) | | 117.8 | |
| Glass Transition Temp. (° C.) | | 53.1 | |
| Acid Value (mgKOH/g) | | 33.8 | |

1)Weight ratio of the polymerization initiator is shown as a weight ratio based on 100 parts by weight of the raw material monomers of a vinyl resin.

Examples 1 to 11 and Comparative Examples 1 to 6

One hundred parts by weight of a resin binder as listed in Table 5, 1 part by weight of a negatively chargeable charge control agent "BONTRON S-34" (manufactured by Orient Chemical Co., Ltd.), 4.0 parts by weight of a colorant "Regal 330R" (manufactured by Cabot Corporation, carbon black), and 2.0 parts by weight of a polypropylene wax "NP-105" (manufactured by MITSUI CHEMICALS, INC., melting point: 140° C.) were mixed with a Henschel mixer, and the mixture obtained was melt-kneaded with a twin-screw extruder. After cooling, the melt-kneaded product obtained was roughly pulverized to a size of about 1 mm with a hammer-mill. The resulting roughly pulverized product was finely pulverized with an air jet-type pulverizer (IDS-2 Model, manufactured by Nippon Pneumatic Mfg. Co., Ltd.), and classified, to provide toner particles having a volume-median particle size ($D_{50}$) of 7.5 μm.

To 100 parts by weight of the resulting toner particles was added 1.0 part by weight of an external additive hydrophobic silica "Aerosil R-972" (manufactured by Nippon Aerosil Co., Ltd., average particle size: 16 nm, hydrophobic treatment agent: dimethyldichlorosilane), and the mixture was blended with a Henschel mixer, to provide each of the toners.

Test Example 1

Low-Temperature Fixing Ability

The fixing device of a copy machine "AR-505" (manufactured by Sharp Corporation) was modified so that fixing could be carried out outside the machine. While sequentially raising the temperature of a fixing roller from 100° to 240° C. in an increment of 10° C., the unfixed images obtained were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated according to the following evaluation criteria. The results are shown in Table 5. Here, the paper used in the fixing test was CopyBond SF-70NA (75 g/m$^2$), manufactured by Sharp Corporation.

[Evaluation Criteria]

A: Lowest fixing temperature is lower than 150° C.

B: Lowest fixing temperature is 150° C. or higher and lower than 170° C.

C: Lowest fixing temperature is 170° C. or higher.

Test Example 2

Hot Offset Resistance

In Test Example 1, a temperature at which offset was initially confirmed was visually judged, upon sequentially raising a temperature of a fixing roller from 90° to 240° C., and hot offset resistance was evaluated in accordance with the following evaluation criteria. The results are shown in Table 5.

[Evaluation Criteria]

A: The hot offset generation temperature is 230° C. or higher.

B: The hot offset generation temperature is 190° C. or higher and lower than 230° C.

C: The hot offset generation temperature is lower than 190° C.

Test Example 3

Durability

A toner was loaded to a printer "PAGEPRESTO N-4" (manufactured by CASIO COMPUTER CO., LTD., fixing: contact-fixing method, development method: nonmagnetic monocomponent development method, diameter of developer roller: 2.3 cm), and printing was conducted continuously on obliquely striped patterns having a print coverage of 5.5% under the environmental conditions of 32° C. and humidity of 85%. During the course of printing, black solid images were printed for every 500 sheets, and the presence or absence of the lines on the formed images was confirmed. At the point where the generation of the lines was observed, printing was stopped, and the test was conducted up to 5,000 sheets at the maximum. Durability was evaluated by defining the number of printed sheets at the point where the generation of lines was visually observed on the images as the number of sheets at which lines were generated by fusion or fixing of toner on a developer roller, in accordance with the following evaluation criteria. In other words, it can be judged that the larger the number of sheets without generation of lines, the higher the durability of toner. The results are shown in Table 5.

[Evaluation Criteria]

A: No lines are generated at printing 5,000 sheets.

B: Lines are generated on printing 2,000 sheets or more and less than 5,000 sheets.

C: Lines are generated on printing less than 2,000 sheets.

TABLE 5

| | Resin Binder (Mixing Ratio of Resins) | Aliphatic Hydroxycarboxylic Acid Compound | Aliphatic Hydroxycarboxylic Acid Compound/Aliphatic Diol Having Hydroxyl Group Bound to Secondary Carbon Atoms (Molar Ratio) | Total number of moles of OH group or groups/ Total number of moles of COOH group or groups | Low-Temp. Fixing Ability | Hot Offset Resistance | Durability |
|---|---|---|---|---|---|---|---|
| Ex. 1 | Resin A1/ Resin A2 (50/50) | Citric Acid | 0.2 | 1.1 | A | A | A |
| Ex. 2 | Resin A2 | Citric Acid | 0.1 | 1.2 | A | B | B |
| Ex. 3 | Resin A3 | Citric Acid | 0.2 | 1.1 | B | B | A |
| Ex. 4 | Resin A4 | Tartaric Acid | 0.2 | 1.3 | B | A | B |
| Ex. 5 | Resin A5 | Citric Acid | 0.2 | 1.1 | B | B | A |
| Ex. 6 | Resin A6 | Citric Acid | 0.4 | 1.2 | B | A | A |
| Ex. 7 | Resin A7 | Citric Acid | 0.2 | 1.1 | A | B | B |
| Ex. 8 | Resin A8 | Citric Acid | 0.2 | 1.1 | A | B | B |
| Ex. 9 | Resin A9 | Citric Acid | 0.2 | 1.3 | B | B | A |
| Ex. 10 | Resin A10 | Citric Acid | 0.2 | 1.1 | A | B | B |
| Ex. 11 | Resin A11 | Citric Acid | 0.2 | 1.1 | B | B | A |
| Comp. Ex. 1 | Resin A12 | None (Lactic Acid) | 0 (0.1) | 1.4 | A | C | C |
| Comp. Ex. 2 | Resin A13 | None (Salicylic Acid) | 0 | 1.4 | C | B | C |

TABLE 5-continued

| | Resin Binder (Mixing Ratio of Resins) | Aliphatic Hydroxycarboxylic Acid Compound | Aliphatic Hydroxycarboxylic Acid Compound/Aliphatic Diol Having Hydroxyl Group Bound to Secondary Carbon Atoms (Molar Ratio) | Total number of moles of OH group or groups/ Total number of moles of COOH group or groups | Low-Temp. Fixing Ability | Hot Offset Resistance | Dura-bility |
|---|---|---|---|---|---|---|---|
| Comp. Ex. 3 | Resin A14 | None (Glycerol) | 0 | 1.3 | B | B | C |
| Comp. Ex. 4 | Resin A15 | None (Trimellitic Anhydride) | 0 | 1.2 | C | A | A |
| Comp. Ex. 5 | Resin A16 | Citric Acid | — | 1.0 | A | C | C |
| Comp. Ex. 6 | Resin A17 | None | 0 | 1.3 | A | C | C |

It can be seen from the above results that Examples 1 to 11 are excellent in all of low-temperature fixing ability, hot offset resistance and durability, as compared to Comparative Examples 1 to 6 in which a polyester without using an aliphatic hydroxycarboxylic acid compound is contained as a resin binder.

INDUSTRIAL APPLICABILITY

The polyester for a toner of the present invention is suitably used as a resin binder of a toner usable in development or the like of latent images formed in, for example, electrophotography, electrostatic recording method, electrostatic printing method or the like.

The invention claimed is:

1. A resin binder for a toner, the resin binder comprising a polyester obtained by polycondensing at least one aliphatic hydroxycarboxylic acid compound selected from the group consisting of tartaric acid and citric acid;

an alcohol component comprising an aliphatic diol having a hydroxyl group bound to a secondary carbon atom in an amount of 50% by mol or more; and a carboxylic acid component, provided that the at least one aliphatic hydroxycarboxylic compound is not included, wherein the at least one aliphatic hydroxycarboxylic acid compound and the aliphatic diol having a hydroxyl group bound to a secondary carbon atom are in a molar ratio, i.e. the at least one aliphatic hydroxycarboxylic acid compound/the aliphatic diol having a hydroxyl group bound to a secondary carbon atom, of from 0.05 to 0.8.

2. A toner for electrophotography, comprising the resin binder as defined in claim 1.

3. The resin binder of claim 1, wherein the alcohol component is at least one selected from the group consisting of 1,2-propanediol and 2,3-butanediol.

4. The resin binder of claim 1, wherein the polyester is obtained by a method comprising:

polycondensing the alcohol component and the carboxylic acid component;

adding the at least one aliphatic hydroxycarboxylic acid compound during or after the polycondensing the alcohol component and the carboxylic acid component; and subsequently polycondensing the at least one aliphatic hydroxycarboxylic acid compound, the alcohol component, and the carboxylic acid component.

5. The resin binder of claim 1, wherein an electrophotographic process with a toner comprising the resin binder is capable of yielding a lower fixing temperature, a higher hot offset generation temperature, a greater number of printed sheets before generating lines, or any combination thereof, as compared to an electrophotographic process with a toner comprising a resin binder that does not comprise the at least one aliphatic hydroxycarboxylic acid compound.

6. The toner of claim 2, wherein an electrophotographic process with the toner is capable of yielding a lower fixing temperature, a higher hot offset generation temperature, a greater number of printed sheets before generating lines, or any combination thereof, as compared to an electrophotographic process with a toner that does not comprise the at least one aliphatic hydroxycarboxylic acid compound.

7. An electrophotographic process, comprising printing an image with the toner of claim 2, wherein the process yields a lower fixing temperature, a higher hot offset generation temperature, a greater number of printed sheets before generating lines, or any combination thereof, as compared to a toner that does not comprise the at least one aliphatic hydroxycarboxylic acid compound.

8. The resin binder of claim 1, wherein an electrophotographic process with a toner comprising the resin binder is capable of yielding:

a lowest fixing temperature of lower than 170° C.;

a hot offset generation temperature of 190° C. or higher; and at least 2000 printed sheets before generating lines.

9. The toner of claim 2, wherein an electrophotographic process with the toner is capable of yielding:

a lowest fixing temperature of lower than 170° C.;

a hot offset generation temperature of 190° C. or higher; and at least 2000 printed sheets before generating lines.

10. An electrophotographic process, comprising printing an image with the toner of claim 2, wherein the process yields:

a lowest fixing temperature of lower than 170° C.;

a hot offset generation temperature of 190° C. or higher; and at least 2000 printed sheets before generating lines.

* * * * *